(12) United States Patent
Weaver

(10) Patent No.: US 12,480,934 B1
(45) Date of Patent: Nov. 25, 2025

(54) SYSTEM AND METHOD FOR MONITORING MOLECULAR AGENTS IN VIVO BY ESTIMATING MAGNETIC NANOPARTICLE AGGREGATION

(71) Applicant: Mary Hitchcock Memorial Hospital, for itself and on behalf of Dartmouth-Hitchcock Clinic, Lebanon, NH (US)

(72) Inventor: John B. Weaver, Hanover, NH (US)

(73) Assignee: Mary Hitchcock Memorial Hospital, for itself and on behalf of Dartmouth-Hitchcock Clinic, Lebanon, NH (US)

( * ) Notice: Subject to any disclaimer, the term of this patent is extended or adjusted under 35 U.S.C. 154(b) by 635 days.

(21) Appl. No.: 17/510,169

(22) Filed: Oct. 25, 2021

Related U.S. Application Data

(60) Provisional application No. 63/104,579, filed on Oct. 23, 2020.

(51) Int. Cl.
  *G01N 33/487* (2006.01)
  *B82Y 5/00* (2011.01)
  (Continued)

(52) U.S. Cl.
  CPC ............ *G01N 33/487* (2013.01); *G01J 3/433* (2013.01); *G01N 21/31* (2013.01); *B82Y 5/00* (2013.01);
  (Continued)

(58) Field of Classification Search
  None
  See application file for complete search history.

(56) References Cited

U.S. PATENT DOCUMENTS

| | | | |
|---|---|---|---|
| 6,825,655 B2 * | 11/2004 | Minchole | G01N 27/74 204/557 |
| 8,954,131 B2 | 2/2015 | Weaver | |

(Continued)

OTHER PUBLICATIONS

Hoopes et al., "In Vivo Imaging and Quantification of Iron Oxide Nanoparticle Uptake and Biodistribution", Proc SPIE Int Soc Opt Eng, Mar. 23, 2012, 8317, 14 pages.

(Continued)

*Primary Examiner* — Nasima Monsur
(74) *Attorney, Agent, or Firm* — Loginov & Associates, PLLC; William A. Loginov

(57) ABSTRACT

This invention provides a system and method for use of MSB with respect to nanoparticles to non-invasively so as to detect certain conditions, such as viral infection and immunological responses thereto. The system and method employs MSB, for example to detect and quantify antibody-specific NP aggregation to measure the concentration of molecular biomarkers in a wide variety of environments. The system and method can effectively differentiate antibody-specific aggregation from viscosity and temperature, which vary naturally in many environments we wish to explore. Advantageously, the system and method can provide a wide range of potential applications including, but not limited to, in vivo monitoring of immunotherapy efficacy, surgical site infection surveillance, chronic surgical pain monitoring and testing for contagions, which can be performed rapidly and at minimal cost in the field using (e.g.) unprocessed body fluid samples (blood, saliva, mucus and/or urine).

20 Claims, 10 Drawing Sheets

(51) Int. Cl.
  *B82Y 25/00*   (2011.01)
  *B82Y 30/00*   (2011.01)
  *B82Y 35/00*   (2011.01)
  *B82Y 40/00*   (2011.01)
  *G01J 3/433*   (2006.01)
  *G01N 21/31*   (2006.01)
  *B82Y 20/00*   (2011.01)

(52) U.S. Cl.
  CPC .............. *B82Y 20/00* (2013.01); *B82Y 25/00* (2013.01); *B82Y 30/00* (2013.01); *B82Y 35/00* (2013.01); *B82Y 40/00* (2013.01); *G01J 2003/4336* (2013.01)

(56) References Cited

U.S. PATENT DOCUMENTS

| | | | |
|---|---|---|---|
| 10,222,438 B2 | 3/2019 | Weaver | |
| 10,502,735 B2* | 12/2019 | Weaver | |
| 2007/0111330 A1* | 5/2007 | Hong | G01N 33/54326 436/526 |
| 2009/0164161 A1 | 6/2009 | Hong | B82Y 25/00 324/204 |
| 2009/0196831 A1* | 8/2009 | Yang | B82Y 5/00 530/391.1 |
| 2011/0226066 A1* | 9/2011 | Anand | G01B 7/18 252/502 |
| 2016/0038610 A1* | 2/2016 | Trabolsi | A61K 31/675 604/20 |
| 2016/0153980 A1* | 6/2016 | Durand | G01N 21/6428 506/13 |
| 2016/0158387 A1* | 6/2016 | Khnadhar | A61K 41/0052 600/12 |
| 2019/0064289 A1* | 2/2019 | Garraud | G01N 24/08 |

OTHER PUBLICATIONS

Perreard IM, Reeves DB, Zhang X, Kuehlert E, Forauer ER, Weaver JB, "Temperature of the magnetic nanoparticle microenvironment: estimation from relaxation times", Phys Med Biol 2014;59(5):1109-19.

Rauwerdink, A. M., Giustini, A. J. and Weaver, J. B. 2010, "Simultaneous quantification of multiple magnetic nanoparticles," Nanotechnology 21 455101.

Reeves D. B. and Weaver J. B. 2014, "Magnetic nanoparticle sensing: decoupling the magnetization from the excitation field," J. Phys. D: Appl. Phys. 47 045002 (8pp).

Sohail K. Mirza and John B. Weaver, U.S. Appl. No. 16/779,556, entitled System and Method to Measure Pain Levels of Patients Following Surgery, filed Jan. 31, 2020.

Weaver et al., "Quantification of magnetic nanoparticles with low frequency magnetic fields: compensating for relaxation effects", 2013, Nanotechnology, 24 ,325502, 7 pages.

Weaver, J. B. and Kuehlert, E., "Measurements of Magnetic Nanoparticle Relaxation Times," Medical Physics 39(5):2765-2770 May 2012 PMID: 22559648.

Weaver, J. B., Rauwerdink, A. M., and Hansen, E. W., "Magnetic Nanoparticle Temperature Estimation," Medical Physics 36(5):1822-1829 (2009).

X. Zhang, D. B. Reeves, I. M. Perreard, W. C. Kett , K. E. Griswold, B. Gimi, J. B. Weaver, "Molecular Sensing with Magnetic Nanoparticles Using Magnetic Spectroscopy of Nanoparticle Brownian Motion," Biosensors and Bioelectronics 50:441-446 (2013) PMID: 23896525.

Yipeng Shi, J. B. Weaver, "Concurrent Quantification of Magnetic Nanoparticles Temperature and Relaxation Time" Medical Physics 46:4070-4076 (2019).https://doi.org/10.1002/mp.13655.

Yu, X., Yang, Y-P., Dikici, E., Deo, S. K. and Daunert, S., 2017 "Beyond Antibodies as Binding Partners: The Role of Antibody Mimetics in Bioanalysis," Annu Rev Anal Chem (Palo Alto Calif) 10 293-320.

\* cited by examiner

SYSTEM AND METHOD FOR MONITORING MOLECULAR AGENTS IN VIVO BY ESTIMATING MAGNETIC NANOPARTICLE AGGREGATION

RELATED APPLICATIONS

This application claims the benefit of U.S. Provisional Application Ser. No. 63/104,579, filed Oct. 23, 2020, entitled SYSTEM AND METHOD FOR MONITORING MOLECULAR AGENTS IN VIVO BY ESTIMATING MAGNETIC NANOPARTICLE AGGREGATION, the entire disclosure of which is herein incorporated by reference.

FIELD OF THE INVENTION

This invention relates to systems and methods for non-invasively scanning regions of the body and/or bodily fluid samples, and more particularly to systems and methods that employ nano-particles to facilitate the determination of bodily conditions.

BACKGROUND OF THE INVENTION

Nanoparticle (NP) magnetic spectroscopy of Brownian motion (or rotation) abbreviated "MSB" is a technique that allows for sensing of static and dynamic conditions within a body and/or fluid by exciting magnetic nanoparticles that are adapted to bind with certain, selected, molecules that may be indicative of biological activities or conditions. Reference is made to U.S. Pat. No. 8,954,131, entitled MAGNETIC PARTICLE IMAGING (MPI) SYSTEM AND METHOD FOR USE OF IRON-BASED NANOPARTICLES IN IMAGING AND DIAGNOSIS, issued Feb. 10, 2015, by John B. Weaver, et al., and the teachings of which are incorporated herein by reference. This patent and related research therearound in Magnetic Spectroscopy of nanoparticle Brownian motion (MSB) (also termed magnetic particle spectroscopy or MPS) allows the user to precisely measure local temperature and concentrations of biomarkers in vivo in a mouse model. See also, by way of useful background information, Weaver J B, Kuehlert E. Measurement of magnetic nanoparticle relaxation time, Med Phys 2012; 39 (5): 2765-70; Zhang X, Reeves D B, Perreard I M, et al., Molecular sensing with magnetic nanoparticles using magnetic spectroscopy of nanoparticle Brownian motion, Biosens Bioelectron 2013; 50:441-6; Weaver J B, Zhang X, Kuehlert E, et al., Quantification of magnetic nanoparticles with low frequency magnetic fields: compensating for relaxation effects, Nanotechnology 2013; 24 (32): 325502; Hoopes P J, Petryk A A, Gimi B, et al., In Vivo Imaging and Quantification of Iron Oxide Nanoparticle Uptake and Biodistribution, Proc SPIE Int Soc Opt Eng 2012; 8317: 83170R; and Perreard I M, Reeves D B, Zhang X, Kuehlert E, Forauer E R, Weaver J B, Temperature of the magnetic nanoparticle microenvironment: estimation from relaxation times, Phys Med Biol 2014; 59 (5): 1109-19.

Further useful background information is taught by U.S. Pat. No. 10,502,735, entitled SYSTEM AND APPARATUS FOR POROUSLY-ENCAPSULATED MAGNETIC-NANOPARTICLE BIOSENSORS by John B. Weaver, et al., the teachings of which are incorporated herein by reference. This system more generally measures the concentration of biomarker molecules in the body. The exemplary applications include surgical site infection surveillance and cancer immunotherapy monitoring.

By way of further background, the above-referenced developments teach microscopic biocompatible probes filled with magnetic nanoparticles that can be placed in the surgical field just prior to closing, ensuring measurements reflect the local surgical site environment. MSB technology has been experimentally applied to a rat lumbar radiculopathy model and proof-of-principle demonstrations have timed the course of epidural temperature and concentration of inflammation and pain biomarkers provides objective metrics for surgical site pain. Based upon experimentation using the rat model, it has been surmised that the use of MSB probes for pain measurement in human patients is feasible, and the technology has the potential to be rapidly translated clinically and accepted by surgeons. It is further contemplated that pain measurements can be read out to surgeons and other practitioners (e.g. pain management professionals) with inexpensive systems that can be tailored to the task and capable of point-of-care application. This is described in commonly assigned U.S. patent application Ser. No. 16/779,556, entitled SYSTEM AND METHOD TO MEASURE PAIN LEVELS OF PATIENTS FOLLOWING SURGERY, filed Jan. 31, 2020, the teachings of which are incorporated by reference as useful background information.

Reference is made to FIGS. 1-3, which show prior implementations of a spectrometer arrangement for use with an NP-based sample. FIG. 1 depicts a so-called inline geometry for an exemplary in which the spectrometer 100 defines outer electromagnet-field-generating, drive coils 110 and 120 of appropriate diameter 122, spacing 122 and number of windings. The outer drive coils 110, 120 provide a variable frequency (f) and amplitude A voltage $V_\alpha$ based upon an appropriate generator 130 so as to generate harmonic effects and Brownian motion within NPs infused into the sample 140. Measurement coils 150 closely surround the sample within the generated field of the driving coils and allow detection of changes in the NPs, measured as an output voltage signal $V_m$ 160. The field relationships are shown in associated block 180 in FIG. 1. This signal can be interpreted with appropriate electronics and computing arrangements as described in the above-incorporated U.S. patent applications.

FIGS. 2-3 describe a spectrometer 200 that defines a so-called "perpendicular" geometry. FIG. 2 shows the spectrometer in side view, and FIG. 3 shows the view looking down through the drive coils 210 and 220. By way for further background see Reeves D. B. and Weaver J. B. 2014, "Magnetic nanoparticle sensing: decoupling the magnetization from the excitation field," J. Phys. D: Appl. Phys. 47 045002 (8pp). The drive coils 210, 220 provide a variable frequency (f) and amplitude A voltage using a generator Vα. Secondary coils 240 surround the sample 250, with a field directed perpendicularly to the drive coils 210, 220. The perpendicular field coils 240 are driven by a voltage $V_p$ 242, or produced by permanent magnets, to create a static magnetic field through the sample 250. Measurement or pickup coils 260 are located adjacent to the sample 250, and provide an output voltage $V_m$ 270 that is used to analyze the sample. Associated computing and processing components, with interconnected data acquisition components can be used to control and analyze voltages in each of the exemplary implementations. The field relationships from this arrangement 200 are shown in corresponding block 280 in FIG. 2. In an embodiment, a conventional power amplifier—such as that employed to drive audio speakers can be employed. The pickup coils can be interfaced with a power amplifier—such as those used in audio applications.

Human coronavirus (referred to herein as "SARS-CoV-2"), has emerged as a significant threat to world health, and is responsible for the current pandemic of 2020, in which it is referred to as COVID-19. A critical aspect of control of the COVID-19 virus is testing. Current tests are based upon obtaining fluid samples (e.g. through the nose) of persons suspected to carry the infection and performing appropriate lab-based test procedures, such as PCR analysis. These tests take time, are costly and have been known to result in incorrect results/false-positives. A reliable and accurate test that can either be applied in-vitro, or to easily-obtained samples—for example, urine, saliva, etc. is highly desirable to apply MSB with respect to nanoparticles to non-invasively so as to detect certain conditions, such as viral infection and immunological responses thereto.

SUMMARY OF THE INVENTION

This invention overcomes disadvantages of the prior art by providing a system and method for use of MSB with respect to nanoparticles to non-invasively so as to detect certain conditions, such as viral infection and immunological responses thereto. The system and method employs MSB, for example to detect and quantify antibody-specific NP aggregation to measure the concentration of molecular biomarkers in a wide variety of environments. The system and method can effectively differentiate antibody-specific aggregation from viscosity and temperature, which vary naturally in many environments we wish to explore. Advantageously, the system and method can provide a wide range of potential applications including, but not limited to, in vivo monitoring of immunotherapy efficacy, surgical site infection surveillance, chronic surgical pain monitoring, intracellular monitoring of cellular function and testing for contagions, such as COVID-19, which can be performed rapidly and at minimal cost in the field using (e.g.) unprocessed body fluid samples (blood, saliva, mucus and/or urine).

In an illustrative embodiment, A system and method for isolating magnetic nanoparticle-nanoparticle (NP-NP) binding/aggregation using coated magnetic NPs that bind selectively to at least one discrete compound associated with a biological process is provided. A spectrometer is adapted to scan a sample containing the compound and infused with the NPs and is arranged to apply a magnetic field from at least a drive coil that varies in frequency and amplitude thereacross and receiving a signal from a first pickup coil having an axis that is at least one of (a) inline with and (b) perpendicular to a plane of the drive coil. The system and method determines whether response spectra measured by the pickup coil are unlikely to be generated by a predetermined size distribution associated with aggregation of NPs. Illustratively, a controller for the drive coil applies magnetic fields over a range of frequencies to identify scaling factors at each frequency, in which a change in an average scaling factor is a surrogate for aggregation if a viscosity of the sample is known, or held constant before and after NP aggregation, or if the viscosity is not held constant, then the change in scaling factor over frequency can be used to identify and quantify changes in hydrodynamic size distribution as a surrogate for aggregation when viscosity of the sample is not held constant. Also, illustratively, the controller for the drive coil can apply magnetic fields over a range of amplitudes sufficiently wide to identify scaling factors over amplitude, wherein a change in average scaling factor is a surrogate for aggregation if the temperature of the sample is known or held constant before and after NP aggregation, or the change in scaling factor over amplitude can be used to identify and quantify changes in the core size distribution as a surrogate for aggregation when the temperature of the sample is not held constant. A first perpendicular field coil can focus at least some magnetization affecting the NPs in a plane perpendicular to a magnetic field of the drive coil to isolate feedthrough from the measured signal. Additionally, a second perpendicular field coil can provides a magnetic field in the plane perpendicular in a plane perpendicular to a magnetic field of the drive coil and perpendicular to the first perpendicular field coil. A second pickup coil can be arranged to detect the magnetization in the direction of the field of the drive coil and orthogonal to the axis of the first pickup coil. The controller can also be constructed and arranged to provide an alternating or variable drive currents to the first perpendicular field coil, and the second perpendicular field coil can add two additional dimensions to the measured data, thereby allowing additional parameters to be estimated. A static magnetic field can be selectively applied to assist in the NP-NP binding and/or a strong magnetic field can be selectively applied to break NP-NP bonds. Illustratively, a predetermined ultrasound field selectively can be applied to break at least one of NP-NP bonds and NP binding to the compound. The compound can comprise an antibody indicative of a disease of condition in the body. A process for measuring intracellular concentrations of biomarker molecules if the targeted NPs are introduced into cells can be provided. A process can also be provided for binding different biomarker molecules with, respectively, different strength bonds in conjunction with the use of series of increasingly strong alternating magnetic fields to selectively break up sequentially stronger NP-NP bonds to measure multiple biomarker molecules in the same probe. An associated method for estimating applied fields can be performed to, in turn, estimate a concentration of multiple biomarker molecules in the sample. A targeting process can be used to target a different size or shape of NPs for different, respective, biomarker molecules to measure multiple biomarkers using the same probes. An associated method for estimating the different size or shape of NPs can be performed to, in turn, estimate a concentration of multiple biomarker molecules in the sample. Additionally, a method for estimating parameters of the size distribution, with or without aligning magnetic field can be performed to, in turn, estimate a concentration of multiple biomarker molecules in the sample. The system and method can further comprise a process for binding different biomarker molecules with, respectively, different strength bonds in conjunction with the use of ultrasound beams to selectively break up sequentially stronger NP-NP bonds to measure multiple biomarker molecules in the same probe.

BRIEF DESCRIPTION OF THE DRAWINGS

The invention description below refers to the accompanying drawings, of which:

FIG. 11 is a diagram of a spectrometer according to any of the arrangements of FIGS. 1-7 including an optional coil assembly for generating an ultrasound field adapted to selectively assist in breaking NP-NP bonds in a sample; and.

DETAILED DESCRIPTION

I. General Considerations

Figure 1:
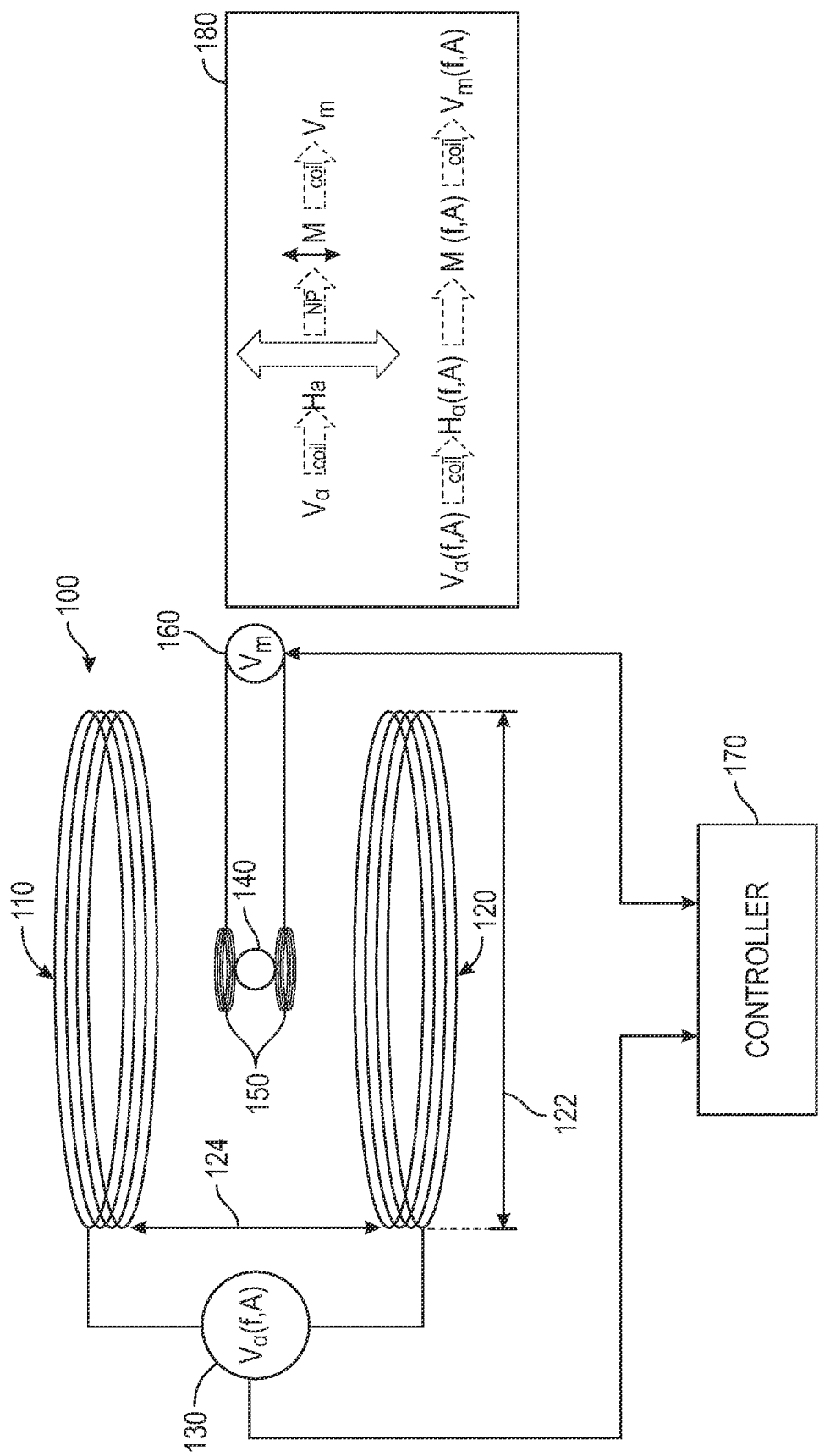
FIG. 1 is a side view spectrometer and associated drive and measurement coils in an inline configuration for use in prior implementations and in accordance with the systems and methods of the present embodiments in which sample temperature and viscosity can be identified and determined.

The MSB signal (e.g. $V_m$ above) typically depends on only two physical factors: viscosity and temperature. By coating the NPs with various agents those physical properties can be used in association with many biological and medical analysis, diagnostic and treatment applications. The illustrative embodiments herein are directed, but not limited to, analysis of the concentration of biomarker molecules. By way of useful background information, see also X. Zhang, D. B. Reeves, I. M. Perreard, W. C. Kett, K. E. Griswold, B. Gimi, J. B. Weaver, "Molecular Sensing with Magnetic Nanoparticles Using Magnetic Spectroscopy of Nanoparticle Brownian Motion," Biosensors and Bioelectronics 50:441-446 (2013) PMID: 23896525; Yipeng Shi, J. B. Weaver, "Concurrent Quantification of Magnetic Nanoparticles Temperature and Relaxation Time" Medical Physics 46:4070-4076 (2019). https://doi.org/10.1002/mp.13655; and U.S. Pat. No. 10,502,735, entitled SYSTEM AND APPARATUS FOR POROUSLY-ENCAPSULATED MAGNETIC-NANOPARTICLE BIOSENSORS, the teachings of which are each incorporated herein by reference.

In the above-described systems and methods, one set of NPs is coated with antibodies for one epitope of the biomarker and another set of NPs is coated with antibodies for another epitope of the biomarker molecule. Alternatively, antibodies can be replaced by aptamers or other targeting molecules. According to a further alternate embodiment, aptamer, antibody or other molecular binding between NPs can be disrupted by the biomarker molecule. In operation, a single biomarker molecule links two NPs together reducing their rotational freedom which changes the MSB signal. These systems and methods can thereby measure most molecules in association with coated NPs with high sensitivity when such molecules are provided in fluid sample or in vivo. Experimentation with the system and method has achieved 10 pM ($10^{-11}$ M) consistently and have individual results showing sensitivity to ~100 fM ($10^{-13}$ M) concentrations when the acquisition times are long. Furthermore, the theoretical limit is very low ~100 zM ($10^{-19}$ M). Successful measurements can be achieved with only a few micrograms or less of coated NPs.

However, the above-referenced systems and methods have a disadvantage that limits usefulness in certain applications. Hence the illustrative systems and methods isolate viscosity changes in the sample and non-specific binding from NP-NP binding, thereby allowing measurement of substantially smaller concentrations in the body (in vivo) and/or in biological samples without (free of) enrichment or extraction or other processing. An example of in vivo application is to monitor immunotherapy agent activity. An example of using no preprocessing would be COVID or contagion testing. Notably, current formalisms cannot differentiate a change in viscosity or a change in temperature from NP-NP antibody specific binding so the sensitivity is limited by the possible changes in viscosity and temperature. Thus, the system and methods herein extend the above-described systems and methods to further isolate NP-NP binding.

II. NP-NP Binding Isolation

It is recognized in the illustrative embodiments herein that scaling over frequency allows the viscosity to be estimated because the NP signal depends on the dimensionless variable $\omega\mu V_h$, where $\omega$ is the frequency of the applied magnetic field, $\mu$ is the viscosity of the fluid and $V_h$ is the hydrodynamic volume of the NP. The response is identical as long as the product $\omega\mu V_h$ is identical. So if $\mu$ is increases by some factor $\varepsilon$, the response can be made identical by decreasing $\omega$ by the same factor $\varepsilon$ as long as $V_h$ does not change. In other words, if $V_h$ does not change, $\mu$ can be found by adjusting $\omega$ till the response is the same as it is for a reference sample; this will occur when the product is identical as for the reference. Similarly, temperature can be determined by scaling the amplitude of the applied magnetic field because the response is a function of the product $V_c H/kT$ where H is the amplitude of the applied magnetic field, $V_c$ is the core volume, k is Boltzmann's constant and T is the temperature. Thus, scaling of $\omega$ will yield T. By way of further background information, see Weaver, J. B., Rauwerdink, A. M., and Hansen, E. W., "Magnetic Nanoparticle Temperature Estimation," Medical Physics 36 (5): 1822-1829 (2009); and Weaver, J. B. and Kuehlert, E., "Measurements of Magnetic Nanoparticle Relaxation Times," Medical Physics 39 (5): 2765-2770 May (2012) PMID: 22559648, the teachings of which are incorporated herein by reference. Scaling $\omega$ correctly to obtain µ yields the same response at all scaled frequencies and scaling H correctly to obtain T yields the same response at all scaled amplitudes. The following are illustrative techniques in accordance with the systems and methods herein to isolate antibody-specific NP-NP binding, which can also be termed herein "aggregation".

III. Further Modifications to Spectrometers

In employing the various spectrometers described herein (see also below), an individual MSB spectra can be evaluated as unlikely to be generated by a given size distribution indicating aggregation. However, this kind of calculation potentially lacks quantitation and specificity. In an embodiment, varying the frequency and/or amplitude and adjusting the range of frequencies and amplitudes 330 (FIG. 3) sampled can be accomplished to ensure that a nonlinear portion of the response curve is addressed. This technique can thereby be employed over a frequency range to identify/determine changes in the hydrodynamic size (via processing arrangement 340 in FIG. 3) as a surrogate for aggregation when the viscosity is known or held constant. A system to control or independently measure the viscosity of the sample in the spectrometers in FIGS. 1-3 will allow estimation of the hydrodynamic size of the NP sample. For example, an exemplary embodiments of the system and method can employ scaling factors over amplitude A, in the arrangement of FIGS. 1-3 over amplitude to identify/determine (via processing arrangement 340 in FIG. 3) changes in the core size as a surrogate for aggregation when the temperature is known or held constant. A system to control or independently measure the temperature of the sample in the spectrometers in FIGS. 1-3 can allow estimation of the core size of the NP sample.

If the viscosity of the sample/internal tissue is not known, and if the scaling at each frequency is not uniform, then the magnitude of the non-uniformity can signify aggregation. One metric to determine such non-uniformity is the standard deviation or first moment of the scaling factor or the slope or shape of the scaling factor over frequency. However any appropriate metric of the hydrodynamic and/or the core volume can be employed as a surrogate for aggregation. The controllers (170 in FIGS. 1 and 360 in FIG. 3) in the spectrometers in FIGS. 1-3 can be further modified to generate applied fields that result in optimized scaling differences optimizing the sensitivity to changes in the size distribution. This modification can allow measurement of temperature. Alternatively temperature can be measured in a manner described in the above-incorporated publication to Yipeng Shi and J. B. Weaver.

If the temperature is not known, and if the scaling at each amplitude is not uniform, then the magnitude of the non-uniformity signifies aggregation. One metric that can be employed to determine such is the standard deviation or first moment of the scaling factor, or the slope or shape of the scaling factor over amplitude. However any metric of the hydrodynamic and/or the core volume can be employed by the system and method as a surrogate for aggregation. The controllers 170, 360 of the above-described spectrometers in FIGS. 1-3 can be modified in a manner clear to those of skill to produce applied fields that result in optimized scaling differences that have optimum sensitivity to changes in the size distribution. The viscosity can also be measured based upon the teachings of the above-incorporated publication to Yipeng Shi and J. B. Weaver.

Figure 2:
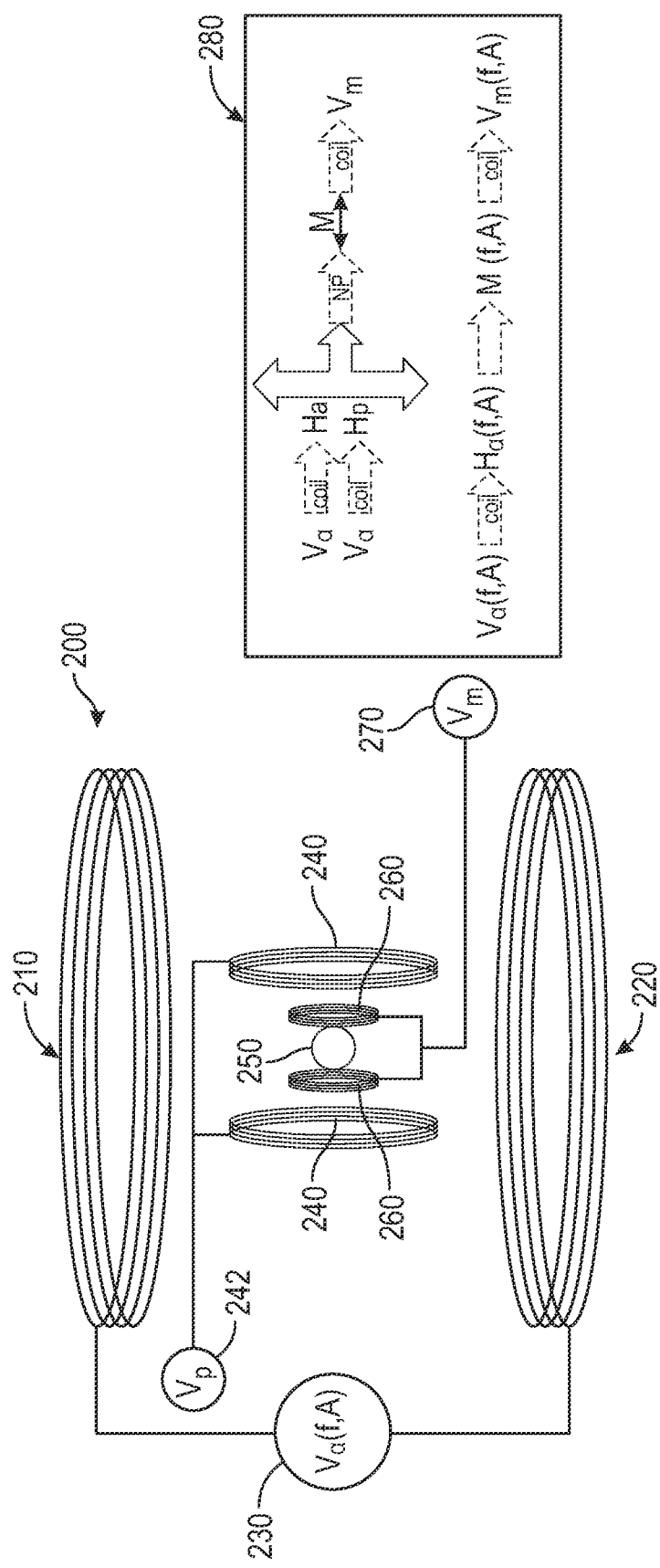
FIGS. 2 and 3 are respective side and top views of a spectrometer and associated drive, perpendicular field and measurement coils for use in prior implementations and in accordance with the systems and methods of the present embodiments in which sample temperature and viscosity can be identified and determined.
Figure 3:
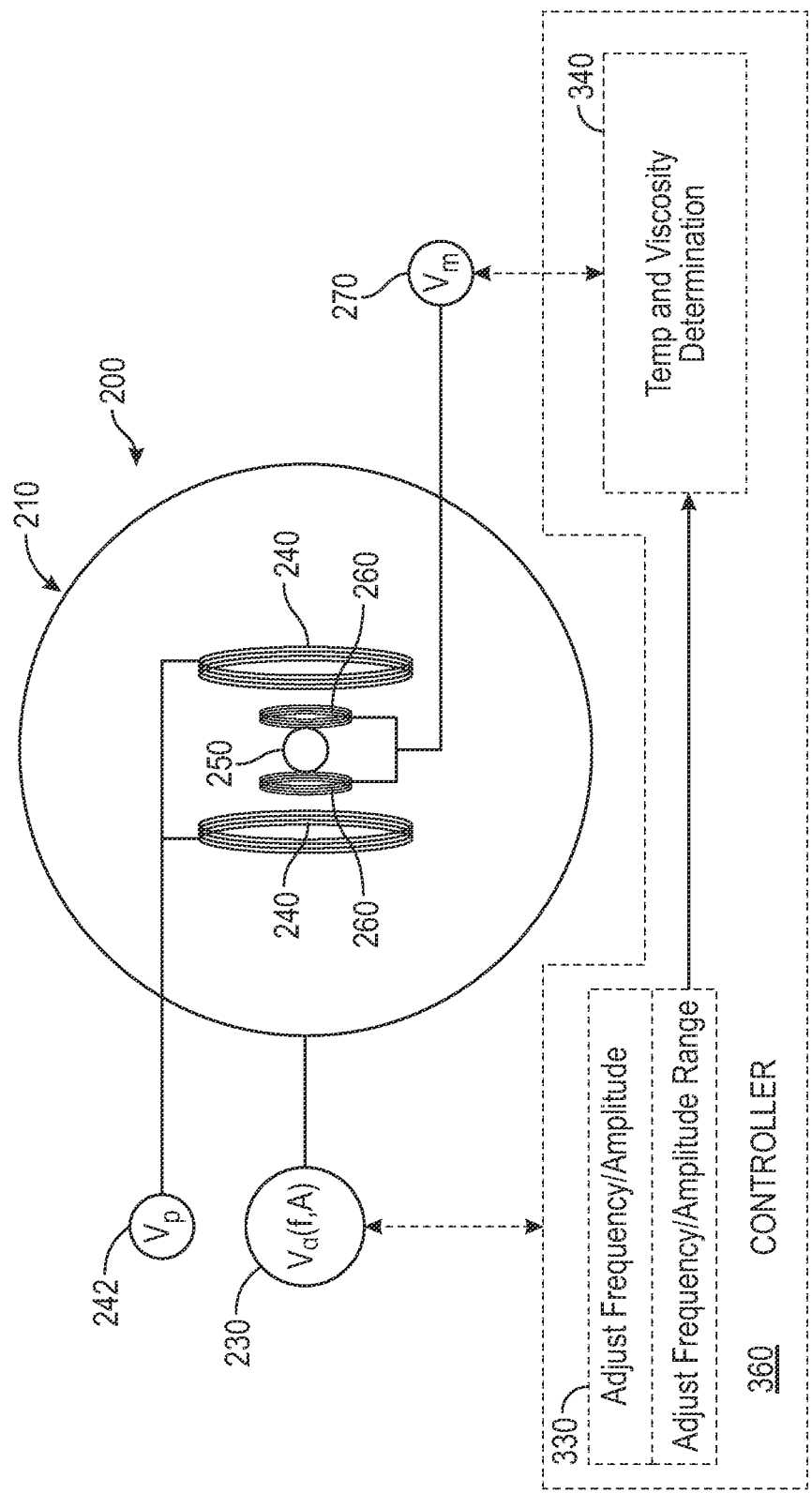
Figure 4:
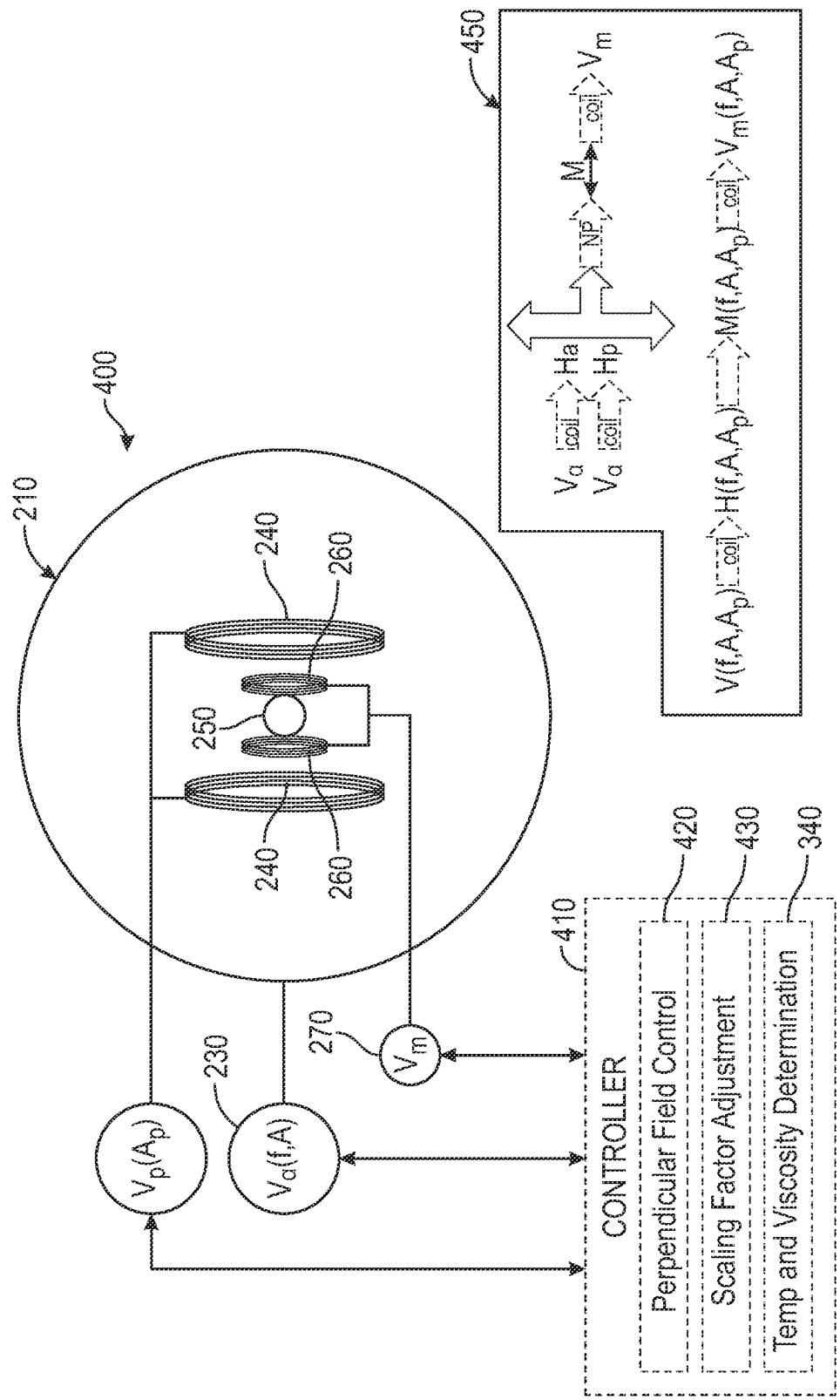
FIG. 4 is a top view of a spectrometer and associated drive, perpendicular field and measurement coils for use in accordance with the systems and methods of the present embodiments in which the amplitude of the perpendicular field is driven in a variable manner by a system controller.

Spectrometers employing the perpendicular geometry, such as the arrangement 200 shown in FIGS. 2 and 3, employ a static perpendicular field (coils 240 and voltage $V_p$) in a manner that provides the spectrometer 400, shown in FIG. 4 to focus some of the magnetization in the direction perpendicular to the alternating drive field to isolate feedthrough from the measured signal. Collecting spectra with different values of the static field produces multidimensional spectra that can be scaled in another dimension (using an appropriate control function 420 in the controller 410) providing a metric for the core size distribution. The metric can be the standard deviation or a moment, or another function of the core size distribution. The spectrometer 400 of FIG. 4 thereby employs additional functions (relative to controller 360 of FIG. 3) within the architecture of the overall system controller 410 to vary the static perpendicular field so as to cover the optimal range of amplitudes as shown in the depicted, associated field relationships in block 450 of FIG. 4. Appropriate adjustment of amplitude and frequency and/or range of amplitude and frequency to obtain scaling factors 430 is shown.

Figure 5:
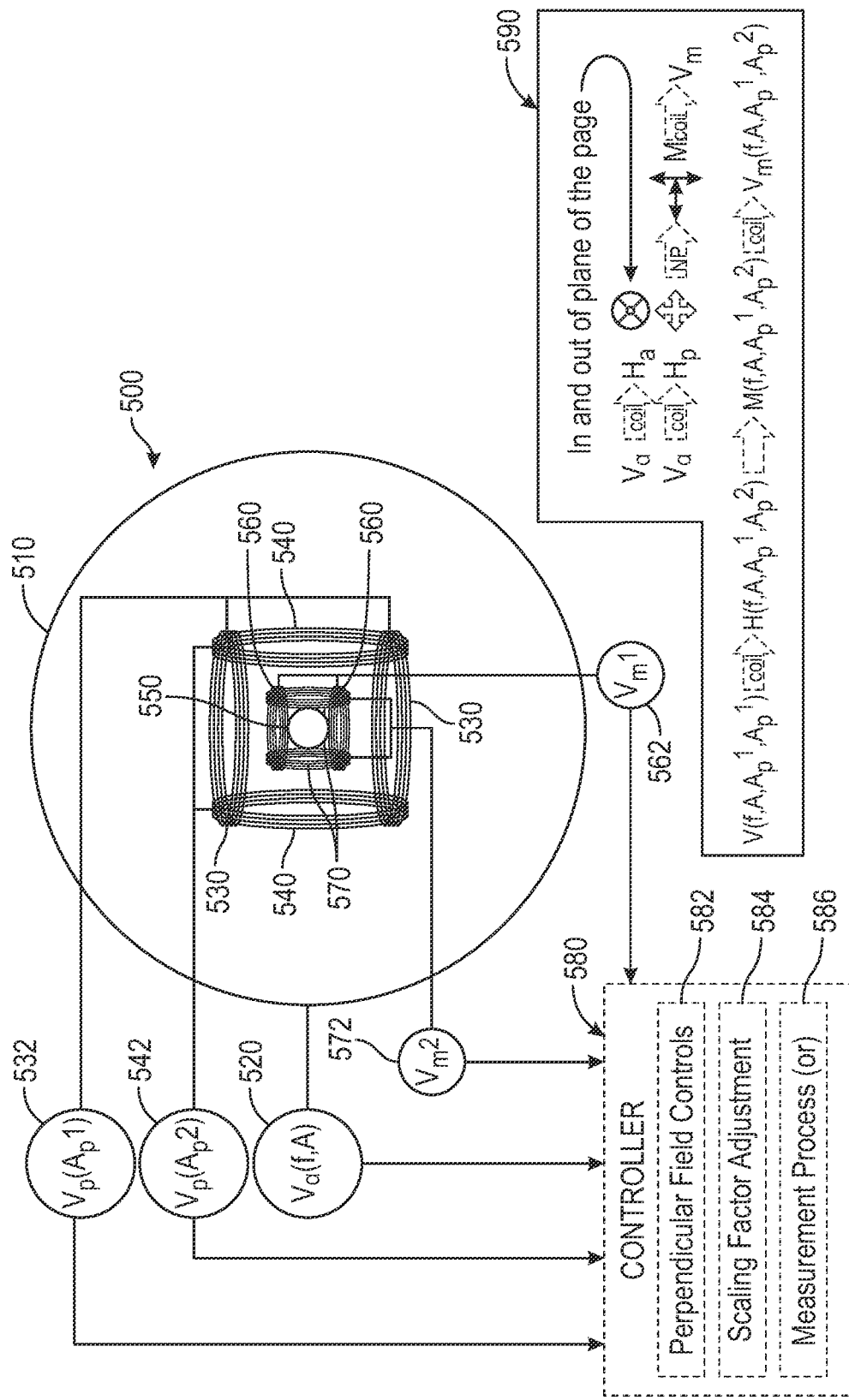
FIG. 5 is a top view of a spectrometer and associated drive, perpendicular field and measurement coils in which two pairs of surrounding perpendicular field coils are provided in orthogonal alignments in the perpendicular plane allowing the perpendicular field to be varied in direction by varying the amplitudes of the two respective currents in the perpendicular coils.

Spectrometers using the perpendicular geometry, as shown in FIGS. 2-4, can be further modified by adding another coil to provide a magnetic field in the plane perpendicular to the alternating drive field and perpendicular to the original perpendicular field. The magnetization in the direction of the new field could be measured with another pickup coil or coils. An example of such a spectrometer arrangement 500 is depicted in FIG. 5. The spectrometer 500 includes an outer drive coil 510 driven by voltage $V_\alpha(f,A)$ 520, with variable frequency f and Amplitude A. In this embodiment, a pair of separately driven perpendicular coils 530 and 540 surround the sample 550, and are driven by voltages $V_p(A_p^1)$ 532 and $V_p(A_p^2)$ 542, respectively. Thus, there are two variable, perpendicular coils in each of two respective perpendicular directions that allow the respective perpendicular field to be varied in direction by varying the amplitudes A of the two currents in the perpendicular coils 530 and 540. This extra dimension to the spectra can be scaled to provide another metric for the core size distribution. The measurement/pickup coils 560 and 570 are also arranged at two perpendicular orientations—in line with respective perpendicular coils 530 and 540. These coils 560 and 570 provide respective measurement voltages $V_m^1$ 562 and $V_m^2$ 572 that are input to the controller 580, and used by the measurement process (or) 586 to provide appropriate outputs with respect to characteristics of the sample, based upon NP aggregation, etc. The controller also includes perpendicular field controls, among other inputs and controls that allow for operation of the spectrometer 500. The characteristics of input voltages and outputs are further shown in block 590 of FIG. 5. Scaling factor adjustment functions 584 in the controller 580, operating as described above can be provided in this and other embodiments described below.

Figure 6:
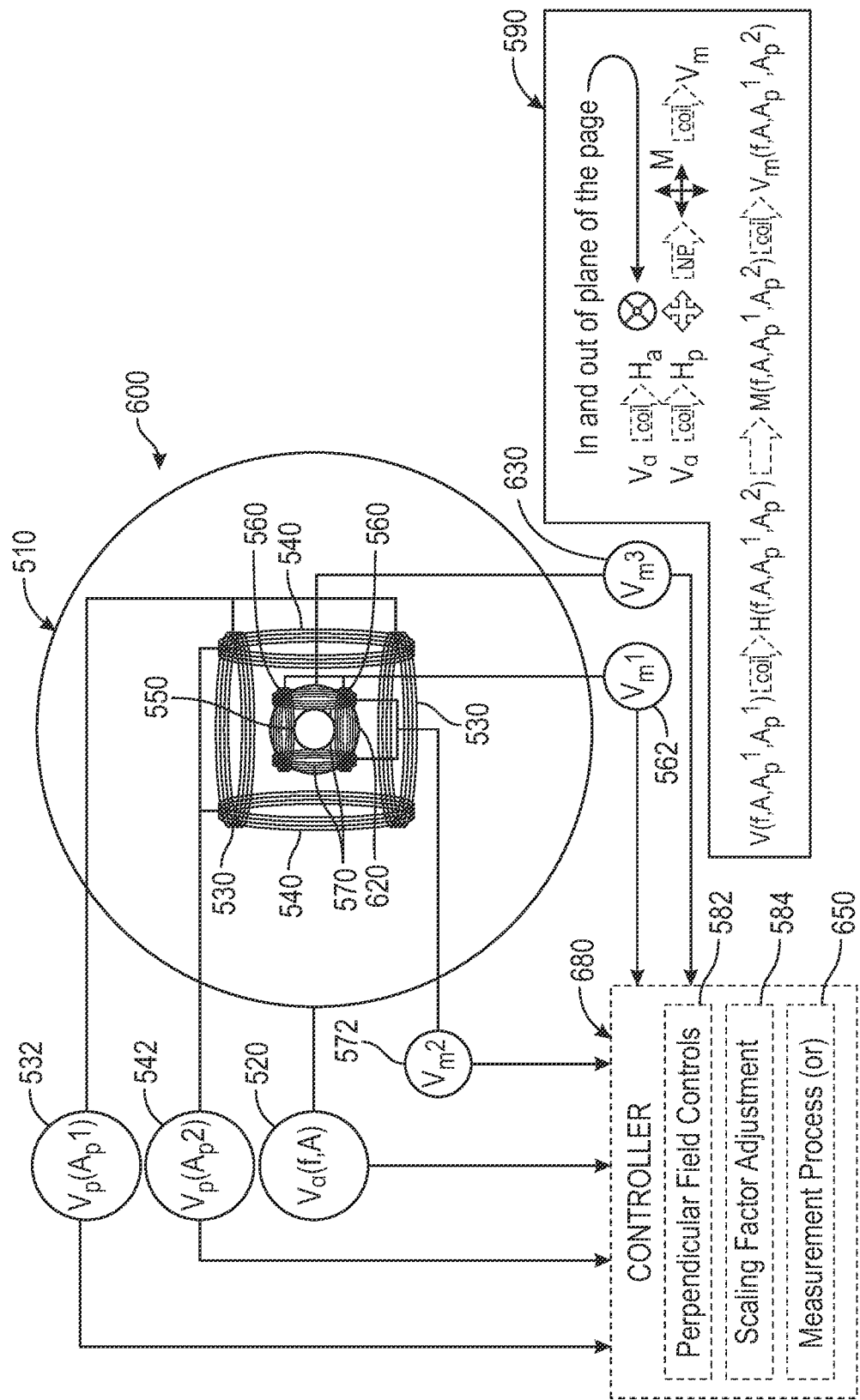
FIG. 6 is a top view of the spectrometer of FIG. 5, modified to further include both perpendicular and inline measurement coils for measuring all three components of the magnetization, whereby the spectrometer arrangement can measure the components of the magnetization in specific designs to find the aggregation and other characteristics of the NP ensemble.

Spectrometers of the perpendicular design, such as the arrangement shown in FIG. 5 can be further modified as shown in the arrangement 600 in FIG. 6 (where similar components to FIG. 5 have like reference numbers) to include an additional measurement/pickup coil 620 to detect the magnetization in the direction of the alternating drive field 510. The extra voltage data $V_m^3$ 630 can be used for scaling to obtain size distribution parameters, or it can be used to improve signal-to-noise ration (SNR). Hence, the arrangement 600 measures all three components of the magnetization of the sample 550. The arrangement functions similarly to the systems used in MPI (referenced above) that measure all three components of the magnetization but in another context. The measurement processor 650 of the modified controller 680 thereby analyzes the components of the magnetization.

It is contemplated that the various controllers described herein can provide for the current/voltage that drives the applied fields in all three directions can define complex waveforms. Such complex driving currents/voltages can provide combinations of static and alternating (time-varying fields). The components of the applied fields can be made independent so they can be varied to provide multidimensional spectra. The more different independent components in each, the more scaled dimensions can be used to obtain more metrics of the size distribution. The amplitude components provide core size distribution parameters and the frequency components provide hydrodynamic size distribution parameters.

Figure 7:
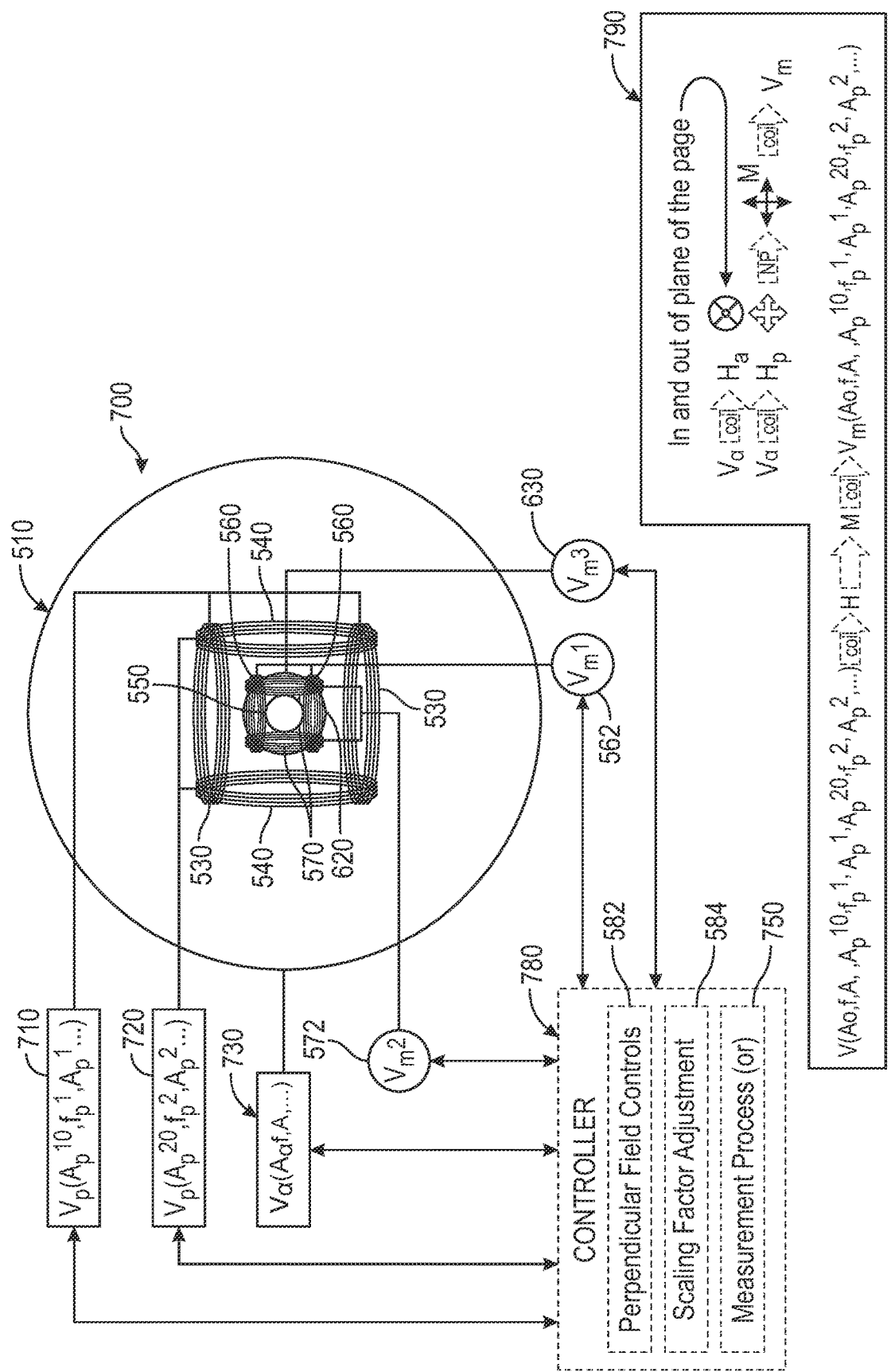
FIG. 7 is a top view of a spectrometer arranged in accordance with FIG. 6, adapted for measuring all three components of the magnetization produced by combinations of static and time varying fields, wherein the measured spectra are multidimensional and the controllers driving the current/voltage in the coils are sufficient to produce the desired fields that allow the scaling to estimate the core and hydrodynamic size distributions, temperature and viscosity.

In an example where the viscosity and temperature are not known, an illustrative technique to compute a variable describing the size and/or size distribution for both the core and hydrodynamic sizes is to use a perpendicular orientation device 700 (arranged similarly to the spectrometer 600 of FIG. 6) as shown in FIG. 7, in which the perpendicular field(s) has/have variable directions in the perpendicular plane(s) characterized by variable phase and variable amplitude. The driving current/voltage for such perpendicular field(s) is depicted as $V_p(A_p^{10}, f_p^{1}, A_p^{1} \ldots)$ 710 driving coil 530, and $V_p(A_p^{20}, f_p^{2}, A_p^{2} \ldots)$ 720 driving coil 540. In this exemplary embodiment, two field amplitude variables are able to scale the core size and the temperature and two field frequency variables are able to scale the hydrodynamic size and the viscosity. This allows 4D scaling to find all four variables: viscosity, temperature, average hydrodynamic size (or other metric) and average core size (or other metric). The four scaled variables are the amplitude and frequency of the alternating drive coils 510 magnetic field (which is driven by a current/voltage characterized by $V_\alpha(A_\alpha, f, A \ldots)$ 730) and the amplitude and rotational frequency of the perpendicular magnetic field. An alternative is the amplitude and frequency of the alternating magnetic field and the amplitude and frequency of the perpendicular magnetic field in the spectrometers shown in FIG. 6. The measurement process (or) 750 of the controller 780 is adapted to read the complex variables generated by this arrangement 700. Likewise, block 790 depicts the input and output variables in this embodiment.

Figure 8:
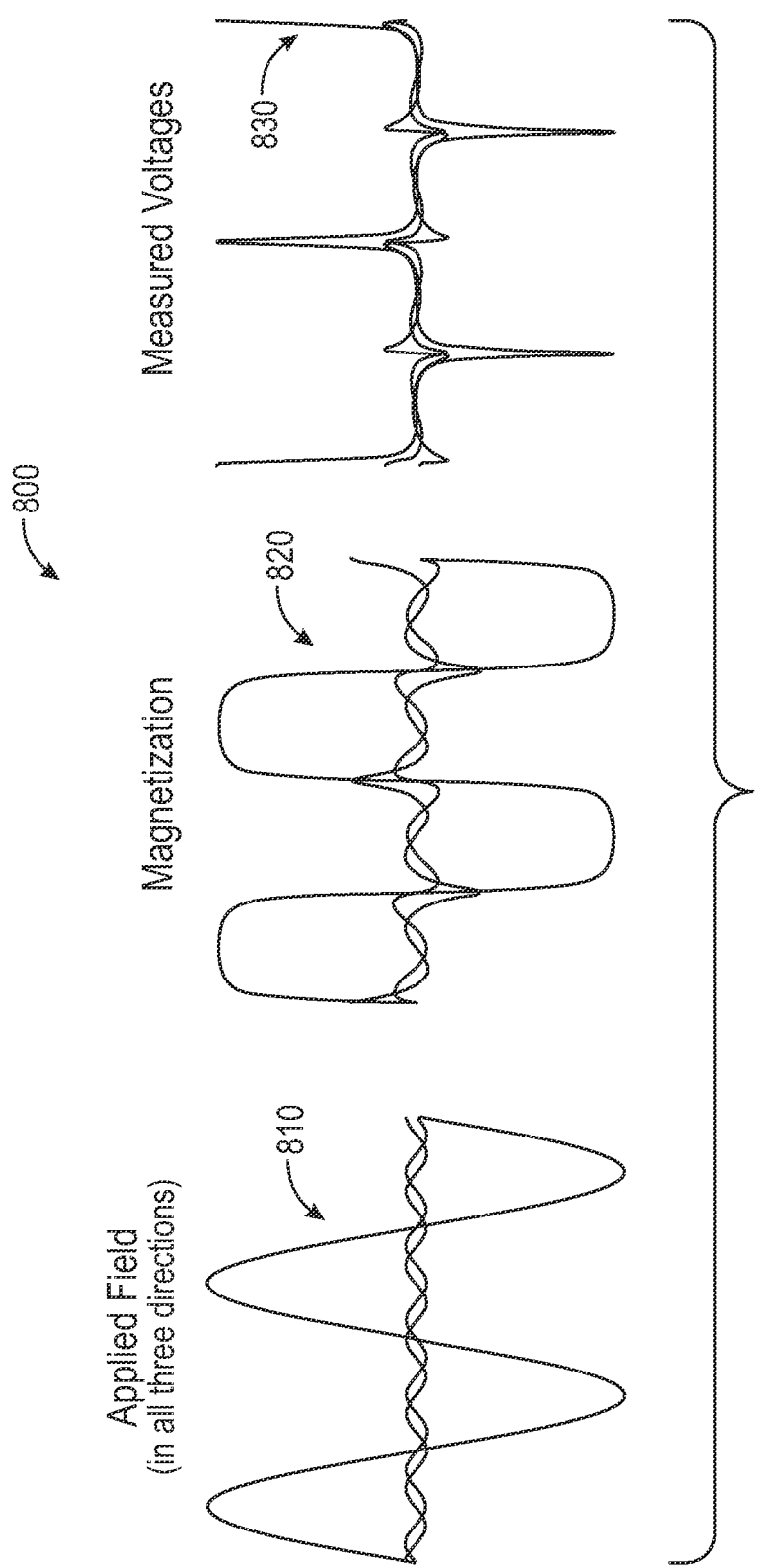
FIG. 8 is a diagram of the graphs of applied magnetic field, magnetization and measured voltages with respect to a sample analyzed in accordance with the arrangement of FIG. 7.

With reference to FIG. 8, an exemplary set of graphs 800 is shown with respect to the applied fields 810, magnetization 820 and measured voltage signal 830 obtained by a relatively simple alternating drive field and rotating uniform perpendicular field using the arrangement 700 of FIG. 7. The spectra are four dimensional and can allow the controller and associated computing process (or) to estimate the temperature-average core size product, viscosity-average hydrodynamic size product, the first moment of the core size over the average core size and the first moment of the hydrodynamic size over the average hydrodynamic size through scaling methods. Alternate combinations of variables can be determined by post-processing using the process (or) 750 or a remote computing device, such as a server or PC. More frequencies and amplitudes can be added by making the applied fields composites of a multiplicity of fields to obtain more metrics for the core and hydrodynamic size distributions.

For in vivo application, isolating phagocytosis of the NPs into cells is desirable for isolating antibody-mediated NP-NP binding because the NPs in compartments within the cell can be compressed enhancing nonspecific NP-NP binding. To eliminate or reduce phagocytosis and the associate non-specific NP-NP binding, the NPs can be enclosed in a container (see above-incorporated U.S. Pat. No. 10,502,735). Liposomes with pore-producing molecules such as perforin are useful containers for that purpose allowing small molecules such as cytokines, hormones and enzymes in while keeping NP inside and reducing the probability of phagocytosis.

If a relationship exists between some of the spectrometer-generated variables describing the core and hydrodynamic size distributions, the number of variables that should be scaled drops and there is flexibility in the type of variable that should be scaled. For example, in an embodiment the spectra can be employed to estimate the concentration of targeted molecules associated with the coated NPs. That is, the NPs are coated with antibodies for the targeted molecule so the NPs are bound together by the targeted molecule. If the initial size distributions are known, then both the core and hydrodynamic size distributions can potentially be estimated for each concentration of targeted molecule. Therefore, the concentration of molecules or any single characteristic of the size distributions can be found from scaling arguments without (free of) solving for any other characteristics of the size distributions like average size or one of the moments of the distribution. In that case, scaling over amplitude and frequency of the alternating magnetic field and amplitude of a static magnetic field perpendicular to the alternating field would allow the viscosity, temperature and antibody specific aggregation to be found using exact scaling. The model describing aggregation should be accurate and the controllers determining the currents in the coils should be adapted to vary over the range of variables and with sufficient resolution to solve for the variables.

In the case of certain variables, such as temperature and that are common to several scaling variables are typically solved from the combination of scaling factors. The correct solution can thereby provide correct values for the size metrics.

Figure 9:
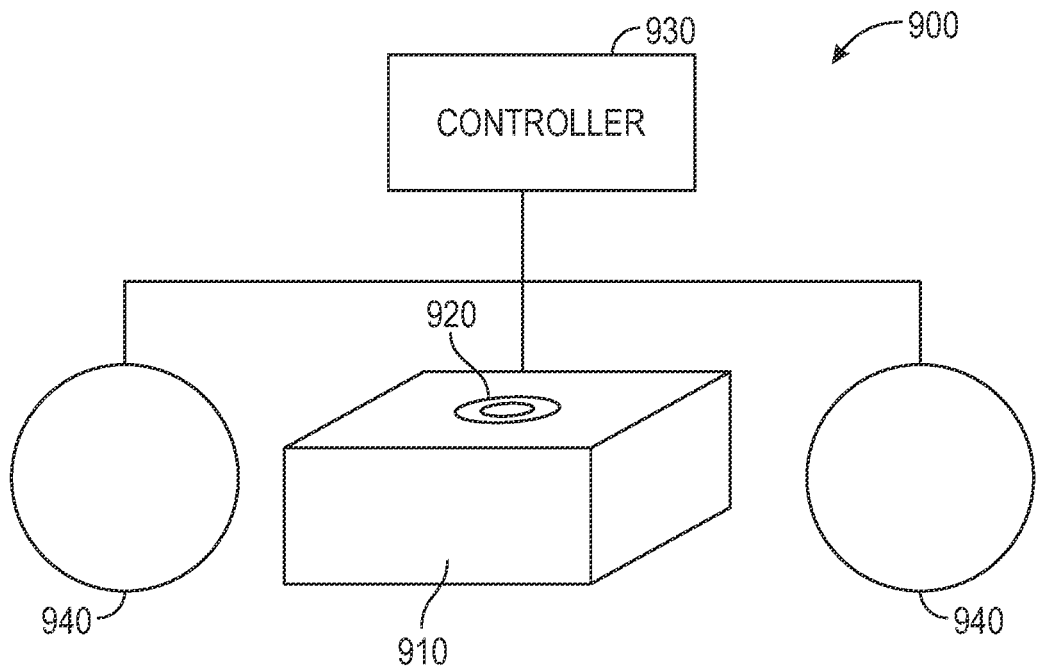
FIG. 9 is a diagram of a spectrometer according to any of the arrangements of FIGS. 1-7 including an optional coil assembly for generating a static magnetic field adapted to selectively assist in aggregation of NPs in a sample.

In another exemplary embodiment, the system 900 shown in FIG. 9 can add a static field to one of the above-described coil arrangements 910 and associated sample(s) 920 during NP-biomarker-NP binding to assist in aligning the core magnetizations during such binding. To allow for this additional field, the system controller 930 and interconnected coils are modified to provide coils 940 necessary to obtain a sufficient field over the period that the NPs are binding. Comparing samples with and without (free of) application of the alignment field can allow the aggregation characteristics to be determined. In an embodiment, the samples with and without (free of) the (static) alignment field can be located in different parts of a probe, or in different locations, or can be part of the same probe but of different sizes so that the applied field has different effects on the core alignments. A static field can be added to any of the exemplary spectrometer arrangements in FIGS. 1 to 7 to provide the above functionality. Alternatively, the signal during binding as the aligning field is turned off and on can allow the aggregation to be estimated. A static field can be added to any of the spectrometers above to provide this function.

In another embodiment, the system 1000 (FIG. 10) can be adapted to apply a very strong alternating magnetic field to the above-described coil 1010 and sample 1020 arrangements. This strong magnetic field can be applied using depicted coils 1040 operated by the modified system controller 1030 (or an external controller), and are capable of breaking weak bonds between NPs, thereby allowing non-specific NP-NP bonds—which tend to be weak—to be isolated from stronger antibody-mediated bonds—which, conversely, measure the biomarker concentration. A strong alternating magnetic field can be integrated with any of the spectrometer arrangements in FIGS. 1 to 7 described above.

Figure 10:
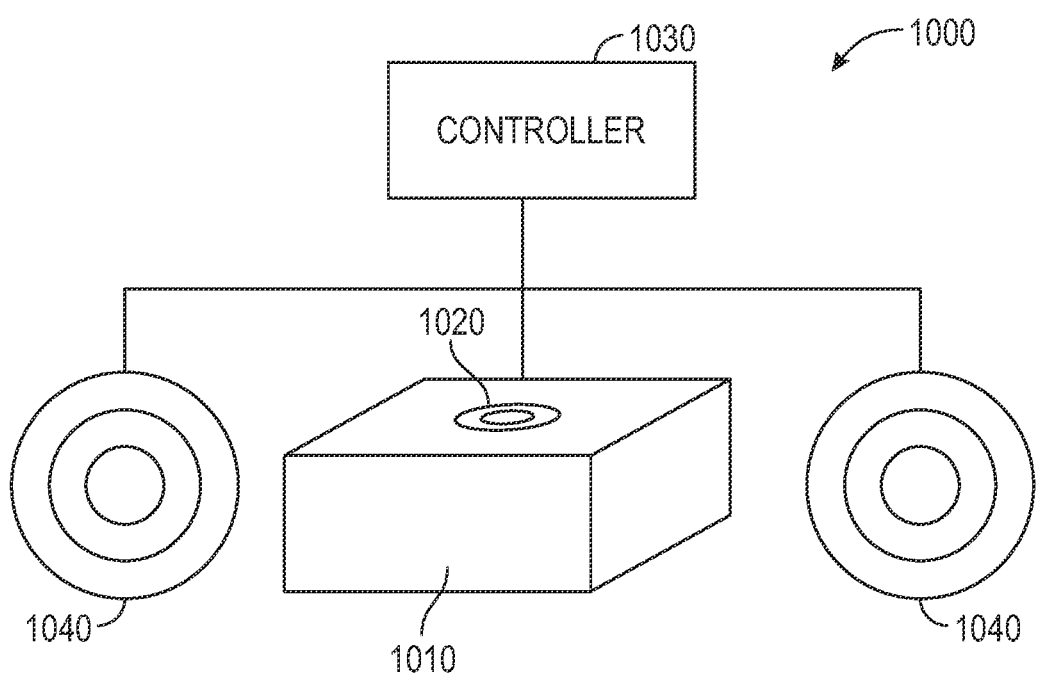
FIG. 10 is a diagram of a spectrometer according to any of the arrangements of FIGS. 1-7 including an optional coil assembly for generating a strong, alternating magnetic field adapted to selectively assist in breaking NP-NP bonds in a sample.
Figure 11:
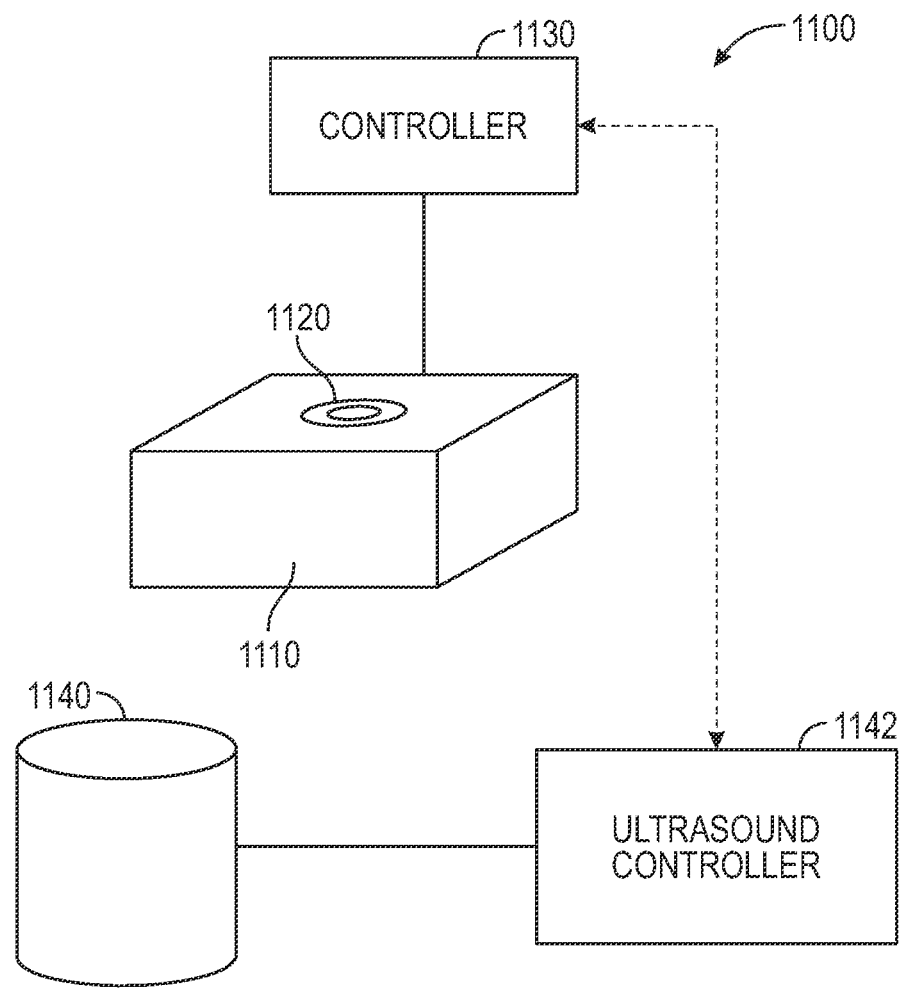

In the arrangement 1100 of FIG. 11 any of the above-described spectrometer arrangements in FIGS. 1-7 (1100) and samples 1120 can be supplemented with an ultrasound emitter and associated controller 1142. The ultrasound controller 1142 can be separate from, or linked, to the overall system controller 1130. An ultrasound field can be selectively applied (at an appropriate magnitude and frequency range) to break up the weak, nonspecific NP-NP binding in an exemplary embodiment in a manner similar to a strong magnetic field described in the arrangement 1000 (FIG. 10).

If sufficiently strong (alternating) magnetic fields are applied (e.g. with the arrangement 1000 of FIG. 10, provided to any of the spectrometers herein), then the antibody-mediated bonds can also be broken to effectively reset the probe so that there is no NP-NP binding at all until the NPs bind the biomarker molecules again.

Alternatively, sufficiently strong/intense ultrasound fields of the appropriate (e.g. harmonic) frequency can break up the antibody-mediated bonds with the biomarker as well. The arrangement 1100 of FIG. 11, provided to any of the spectrometers herein, can be employed in this embodiment. The size of the probe can be adjusted to resonate with the correct frequency to spare tissue damage from the ultrasound beam.

In an exemplary embodiment multiple biomarker molecules can be found using the same probe by targeting each biomarker with a different size NP and isolating each size NP from the signal based upon computations provided by the controller's process (or) or another processing device operating in conjunction with one of the arrangements of FIGS. 1-7. One technique for accomplishing this computation is described by way of background in Rauwerdink, A. M., Giustini, A. J. and Weaver, J. B. 2010, "Simultaneous quantification of multiple magnetic nanoparticles," Nanotechnology 21 455101, the teachings of which are incorporated herein by reference. The methods of estimating metrics of the size distribution described above can also be used to estimate the binding of each size NP. For example, the nonuniformity of the scaling factors at each frequency can be used to estimate the binding of each NP size separately.

In an illustrative embodiment, application of a strong alternating magnetic field (e.g. the arrangement 1000 of FIG. 10 provided to any of the spectrometers herein) can also be used to isolate NP-NP binding caused by different biomarker molecules. A plurality of differing-strength, strength alternating fields can be applied sequentially to measure different biomarker molecule concentrations by breaking apart different groups of NPs sequentially. Such are measured by the associated system controller and process (or). The size of the NP core and the magnitude and frequency of the applied field can determine the force on the aggregate. The binding energy can also be changed by changing the targeting molecules; e.g., the length of the aptamer. The Aptamers for one biomarker can be made shorter resulting in a weaker bond allowing it to be isolated from the NP-NP bonds formed by an antibody, or a longer aptamer with stronger binding. In this manner, two molecular biomarkers can be measured using the same probe. Multiple molecular biomarkers can be isolated through use of a series of strong applied magnetic fields in sequence to break increasing strong bonds under the direction of the system controller. Alternatively ultrasound fields (such as those generated by the arrangement 1100 of FIG. 11 with any of the spectrometers described above) can be used to break the antibody or aptamer binding. Other targeting molecules can be used instead of, or in addition to, antibodies or aptamers; e.g., force amplified biological sensors (FABS), antibody mimetics, other proteins, or other molecules. By way of useful background information, see Yu, X., Yang, Y-P., Dikici, E., Deo, S. K. and Daunert, S., 2017 "Beyond Antibodies as Binding Partners: The Role of Antibody Mimetics in Bioanalysis," Annu Rev Anal Chem (Palo Alto Calif) 10 293-320. Note that the NPs, the NP targeting, and/or spectrometer arrangement can be modified in a manner clear to those of skill to perform such functions.

Note that the above described embodiments, in which fields are added to the spectrometer arrangement are described in terms of scaling arguments because it allows the system and method to know the number of independent variables that can be found. However, the metrics describing size distribution (or other variable(s)) can be found using other computational methods that should be clear to those of skill.

IV. Conclusion

It should be clear that the above-described systems and methods provide an effective tool in analyzing biological samples and in vivo fluids, in a manner that is rapid, accurate and non-invasive. In addition to determining temperature and viscosity, the systems and methods can be adapted to determine a variety of other variables. Application of additional static or alternating magnetic fields or ultrasound can allow for added versatility to the systems and methods herein. Moreover, the devices contemplated in accordance with these systems and methods can be constructed inexpensively, for existing components and allow for updates to processing algorithms/procedures to further enhance functionality and capabilities. More generally, the systems and methods can be used with appropriately coated/biologically targeted NPs to provide effective and rapid testing for dangerous viruses, such as COVID-19, as well as other medical conditions that are characterized by reduced or elevated concentrations of certain biological compounds.

Based upon the above-described techniques, the prior arrangements for spectrometers and use thereof can be applied to a substantially broader range of possible applications. For example, intracellular measurements of molecules characteristic of critical function are possible even with the wide range of viscosities of the cell cytoplasm and intracellular structures. Further, applications in blood vessels where blood flow regulates the temperature are possible. All applications where the viscosity and temperature cannot be regulated or known become possible using the techniques described.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for isolating magnetic nanoparticle-nanoparticle (NP-NP) binding/aggregation using coated magnetic NPs that bind selectively to at least one discrete compound associated with a biological process comprising:
   a spectrometer adapted to:
   scan a sample containing the at least one discrete compound associated with the biological process and infused with the coated magnetic NPs that bind selectively thereto;
   apply magnetic fields from at least one drive coil that varies the magnetic fields in frequency and amplitude thereacross,
   the frequency and amplitude varies independently for at least a portion of the magnetic fields causing viscosity changes in the sample to be distinguishable from bindings between coated magnetic NPs and causing non-specific bindings in the sample distinguishable from bindings between coated magnetic NPs; and
   receive a signal indicative of a response spectra of the sample to the frequency and amplitude variations of the magnetic fields, the signal received from a first pickup coil having an axis that is at least one of (a) inline with and (b) perpendicular to a plane of the at least one drive coil,
   wherein the response spectra includes a plurality of dimensions and the response spectra distinguishes coated magnetic NP-NP bindings from viscosity changes and from non-specific bindings; and
   a computing device configured for determining whether NP-NP bindings in the sample response spectra is consistent with core size distribution and hydrodynamic size distribution estimates that are based on an initial size distribution of the NPs for the sample.

2. The system as set forth in claim 1, wherein a controller for the drive coil applies magnetic fields over a range of frequencies to identify scaling factors at each frequency, wherein a change in an average scaling factor is a surrogate for aggregation if a viscosity of the sample is known, or held constant before and after NP aggregation, or if the viscosity is not held constant, then the change in scaling factor over frequency can be used to identify and quantify changes in hydrodynamic size distribution as a surrogate for aggregation when viscosity of the sample is not held constant.

3. The system as set forth in claim 1, wherein a controller for the drive coil applies magnetic fields over a range of amplitudes sufficiently wide to identify scaling factors over amplitude, wherein a change in average scaling factor is a surrogate for aggregation if the temperature of the sample is known or held constant before and after NP aggregation, or the change in scaling factor over amplitude can be used to identify and quantify changes in the core size distribution as a surrogate for aggregation when the temperature of the sample is not held constant.

4. The system as set forth in claim 1, further comprising, a first perpendicular field coil that focuses at least some magnetization affecting the NPs in a plane perpendicular to a magnetic field of the drive coil to isolate feedthrough from the measured signal.

5. The system as set forth in claim 4, further comprising, a second perpendicular field coil that provides a magnetic field in a plane perpendicular to a magnetic field of the drive coil and perpendicular to the first perpendicular field coil.

6. The system as set forth in claim 5, further comprising, a second pickup coil arranged to detect the magnetization in the direction of the field of the drive coil and orthogonal to the axis of the first pickup coil.

7. The system as set forth in claim 6, wherein a controller is constructed and arranged to provide an alternating or variable drive currents to the first perpendicular field coil and the second perpendicular field coil adding two additional dimensions to the measured data, thereby allowing additional parameters to be estimated.

8. The system as set forth in claim 7, further comprising, a static magnetic field selectively applied to assist in the NP-NP binding.

9. The system as set forth in claim 7, further comprising, a strong magnetic field selectively applied to break NP-NP bonds.

10. The system as set forth in claim 7, further comprising, a predetermined ultrasound field selectively applied to break at least one of NP-NP bonds and NP binding to the compound.

11. The system as set forth in claim 1, wherein the compound comprises an antibody indicative of a disease of condition in the body.

12. The system as set forth in claim 1, further comprising, a process for measuring intracellular concentrations of biomarker molecules if the targeted NPs are introduced into cells.

13. The system as set forth in claim 1, further comprising, a process for binding different biomarker molecules with, respectively, different strength bonds in conjunction with the use of series of increasingly strong alternating magnetic fields to selectively break up sequentially stronger NP-NP bonds to measure multiple biomarker molecules in same probe.

14. The system as set forth in claim 1, further comprising a targeting process that targets a different size or shape of NPs for different, respective, biomarker molecules to measure multiple biomarkers using same probes.

15. A method for estimating parameters of the size distribution, with or without aligning magnetic field with the system as set forth in claim 8 to, in turn, estimate a concentration of multiple biomarker molecules in the sample.

16. A method for estimating applied fields with the system as set forth in claim 13 to, in turn, estimate a concentration of multiple biomarker molecules in the sample.

17. A method for estimating the different size or shape of NPs with the system as set forth in claim 14 to, in turn, estimate a concentration of multiple biomarker molecules in the sample.

18. The system as set forth in claim 1, further comprising, a process for binding different biomarker molecules with, respectively, different strength bonds in conjunction with the use of ultrasound beams to selectively break up sequentially stronger NP-NP bonds to measure multiple biomarker molecules in same probe.

19. The system of claim 1, wherein the computing device processes aspects of the amplitude to provide core size distribution parameters associated with the aggregation of NPs.

20. The system of claim 1, wherein the computing device processes aspects of the frequency to provide hydrodynamic size distribution parameters associated with the aggregation of NPs.

\* \* \* \* \*